United States Patent [19]
Hartman

[11] 4,363,577
[45] Dec. 14, 1982

[54] APPARATUS FOR CONVERTING POWER CHAIN SAW INTO A BORING TOOL

[76] Inventor: Robert Hartman, Apt. 100, Steven Phillips, Monaca, Pa. 15061

[21] Appl. No.: 220,368

[22] Filed: Dec. 29, 1980

[51] Int. Cl.[3] ........................ B23B 43/00; B27G 17/00
[52] U.S. Cl. ........................................ 408/20; 408/124; 144/35 A
[58] Field of Search .................... 408/20, 22, 127, 128, 408/125, 124; 144/35 A

[56] References Cited

U.S. PATENT DOCUMENTS 3,736,991 6/1973 Maine .................................... 408/20
4,227,840 10/1980 Thiverge ............................... 408/20

*Primary Examiner*—Leonidas Vlachos
*Attorney, Agent, or Firm*—Parmelee, Miller, Welsh & Kratz

[57] ABSTRACT

An apparatus for converting a power chain saw into a boring tool is disclosed and consists of an adapter housing which is detachably mounted onto the free end of the saw's chain guide. The housing includes a rotatable shaft mounted therein and extending therethrough with a sprocket fixedly mounted onto the shaft within the housing. A chuck is mounted on the shaft for securing a boring tool thereon. The sprocket is driven by a chain which is in communication with the motor of the chain saw.

5 Claims, 3 Drawing Figures

APPARATUS FOR CONVERTING POWER CHAIN SAW INTO A BORING TOOL

FIELD OF THE INVENTION

The invention relates generally to boring devices and more particularly to a boring attachment which when mounted onto the free end of the chain guide of a chain saw converts the chain saw into a portable boring tool.

BACKGROUND OF THE INVENTION

Over the years there have been many attempts to maximize the utility of power tools by providing various types of attachments which convert a tool from its primary function to a secondary function. One early example of just such an attempt is found in U.S. Pat. No. 2,544,461 in which an electric hand drill is fitted with a device which converts the drill into a sawing tool.

Various apparatuses have been proposed to convert chain saws into power drills. For instance, U.S. Pat. No. 2,489,772 provides an attachment which is driven by the sprocket of a chain saw and through a friction clutch powers a drilling tool. In U.S. Pat. No. 2,526,131 a massive boring device is mounted to the motor housing of a chain saw for use in boring chain holes in logs. Both of these devices require two workmen for safe operation, one on the boring side of the tool and one on the chain saw motor housing side. A chain saw attachment for operating rotatable tools is disclosed by U.S. Pat. No. 2,783,794 which employs a drive belt which is mounted on separate pulleys and runs parallel to the chain saw cutting chain.

It is an object of the present invention to provide a boring attachment which can readily be attached to or removed from the chain guide of a chain saw and converts the chain saw into a versatile and portable drilling tool which can be easily and safely operated by a single workman.

SUMMARY OF THE INVENTION

A chain saw drill conversion apparatus consists of a sprocket housing which is removably mountable onto the free end of a chain saw chain guide to extend beyond the roller nose of the chain guide. A shaft is rotatably mounted in the sprocket housing and extends through the side of the housing such that the rotational axis of the shaft is parallel with the rotational axis of the roller nose. A sprocket is fixidly mounted onto the shaft and is in a common plane with the roller nose. A chuck on the end of the shaft extending from the housing provides a means by which a boring device or a rotatable tool may be mounted onto the shaft. The sprocket is driven by a chain which travels along the upper and lower edges of the chain guide beyond the roller nose and about the sprocket at one end of the chain guide and about the drive sprocket of the chain saw motor. While it is possible to use a chain provided with cutting teeth to drive the boring attachment sprocket, it is preferred that a noncutting chain free of teeth be employed.

The boring attachment is provided with a handle on the side thereof opposite the chuck so that an individual workman is afforded optimum control of the tool, for he can support the chain saw housing with the handle provided thereon with one hand while guiding the boring tool by its handle with his other hand.

DETAILED DESCRIPTION OF THE INVENTION

Figure 1:
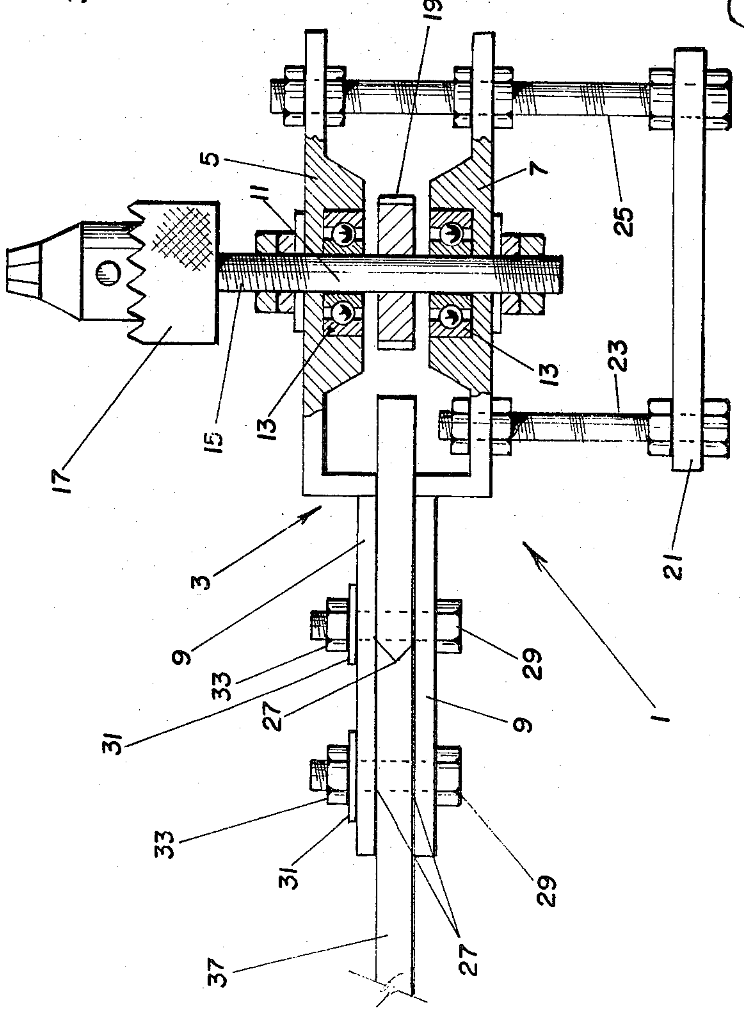
FIG. 1 is a plan view of the apparatus of the instant invention with the sprocket housing shown in cross section.

In FIG. 1 a boring attachment for use in combination with a conventional power chain saw is generally indicated by the reference character 1. The boring attachment 1 includes a housing 3 consisting of side members 5 and 7 from which mounting brackets 9 extend. A shaft 11 is mounted within the housing 3 and extends through at least one side member 5 of the housing 3. The shaft 11 is mounted for rotational movement that is facilitated by any number of conventional methods such as bearings 13. On the end of the shaft 11 which extends through the housing, as at 15, means such as chuck 17, are provided for securing a boring tool onto the shaft. A chain sprocket 19 is fixidly mounted on the shaft 11 within the housing. The particular size and number of teeth on the sprocket 19 will be determined in conjunction with the speed of the chain saw motor and the link size of the chain drive employed as determined by the size of the motor drive sprocket. A handle 21 may be mounted on the housing side member 7 and supported in a spaced relation therewith by first and second threaded rods 23 and 25. In addition to supporting one side of handle 21, the rod 25 may extend through and secure into the housing side walls 5 and 7 in order to hold the forward portion of the side walls in a fixed spaced relation.

Figure 3:
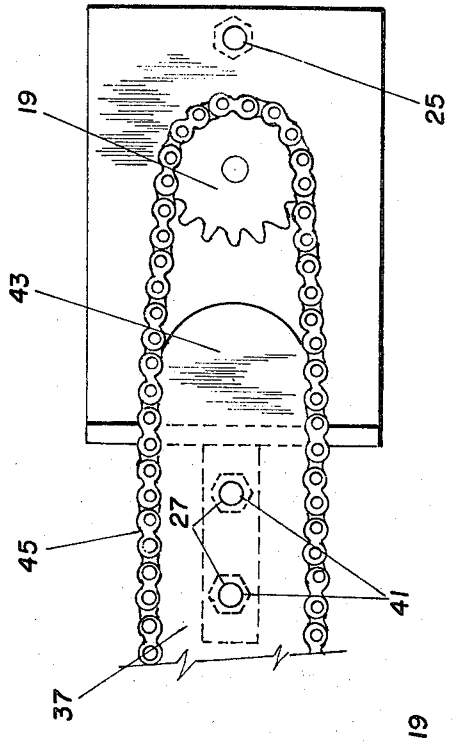
FIG. 3 is a side elevation view of the instant invention mounted onto the free end of the chain guide of a chain saw, with portions cutaway.
Figure 2:
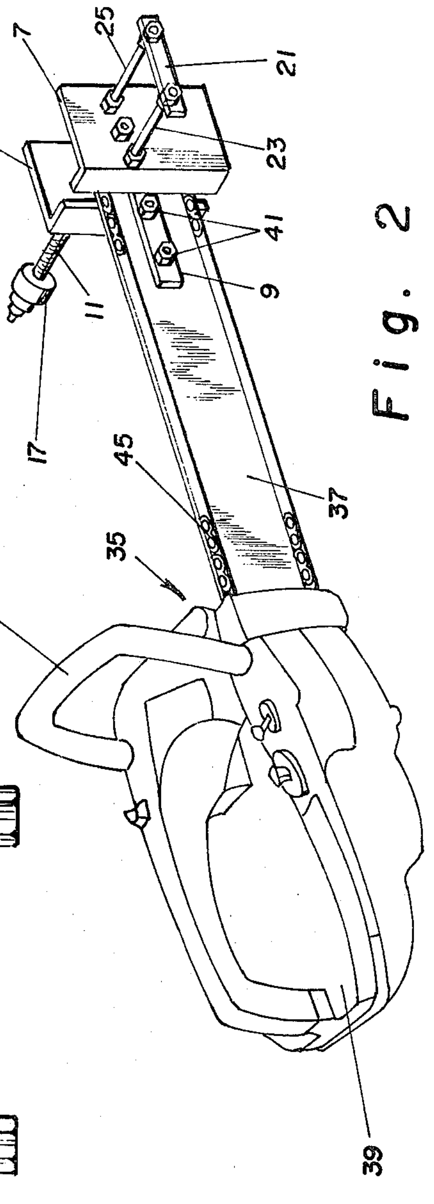
FIG. 2 is an isometric view of a chain saw converted into a boring tool by the attachment of the apparatus of the instant invention thereon.

The mounting brackets 9 which extend from the rear of the housing side walls have at least two aligned holes 27 through which a bolt 29 may pass and be secured therein by lockwashers 31 and nuts 33. As can be seen in FIGS. 2 and 3, a conventional chain saw 35 is adapted so that the chain guide 37 has a pair of spaced holes 41 arranged to align with the holes 27 in the brackets 9. Typically the chain guide 37 has a roller nose 43 rotatably mounted at the free end thereof and about which a continuous cutting chain travels as the chain rides along the upper and lower edges of the chain guide, being driven thereabout by a motor within the housing 39.

For obvious safety reasons it is preferred that a special chain without cutters be employed when the boring attachment is mounted onto the chain saw. To mount the boring attachment 1 onto the chain guide 37 the cutting chain is first removed from the saw. The housing 3 mounts onto the free end of the chain guide 37 and extends beyond the roller nose 43. The bolts 29 pass through the chain guide 37 and the brackets 9 which straddle the chain guide, securing the boring attachment in a fixed position on the chain saw. When the boring attachment is properly mounted, the rotational axis of the chain sprocket 19 is parallel with the rotational axis of the roller nose 43 and the chain sprocket and roller nose share a common plane. A continuous drive chain 45 rides along the upper and lower edges of the chain guide 37 and about the chain sprocket 19 and through the chain saw housing 39 where the chain is in communication with the chain saw motor. The noncutting drive chain 45 would of course be slightly longer than the normal cutting chain of the saw (not illustrated) because the cutting chain would only ride about the roller nose while the continuous drive chain must turn about the chain sprocket which is positioned out beyond the roller nose.

Once the boring attachment is properly mounted and the drive chain attached a powerful and portable boring tool is available for immediate use. As a safety precaution, a light-weight metal cover (not illustrated) may be attached to the guide bar to conceal the chain and sprocket. During operation of the tool, a workman can easily support and control the tool by grasping the handle 47 of the chain saw housing with one hand and the boring attachment handle 21 with his other hand.

The boring attachment can be easily and quickly removed from the chain guide and the noncutting chain replaced by a cutting chain. What has been described is a boring attachment which can readily convert a conventional chain saw into a boring tool.

What is claimed is:

1. An apparatus for converting a power chain saw into a boring tool, said chain saw including a motor housing, a motor within said housing, a chain guide extending from said housing and a roller nose rotatably mounted in the free end of the chain guide, wherein said apparatus comprises: a sprocket housing; a shaft rotatably mounted in said sprocket housing with one end of said shaft extending beyond said sprocket housing; a sprocket fixidly mounted onto said shaft and within said housing; a boring tool securing means mounted onto said extending end of said shaft; bracket means extending from said sprocket housing for securing said sprocket housing to the free end of said chain guide so that said shaft is parallel with the rotational axis of said roller nose and said sprocket shares a common plane with said roller nose; and an endless chain in communication with said sprocket and said chain saw motor, traveling therebetween along said chain guide.

2. The apparatus of claim 1 including a handle mounted onto and extending from the sprocket housing on a side thereof opposite the boring tool securing means.

3. The apparatus of claim 1 wherein the continuous chain is a noncutting chain.

4. The apparatus of claim 1 wherein the sprocket housing includes bearing means in which the rotatable shaft is mounted.

5. The apparatus of claim 1 wherein the bracket means and the chain guide have holes there through which bolts may pass and secure said bracket means to said chain guide.

* * * * *